(12) United States Patent
Pan

(10) Patent No.: US 7,538,981 B1
(45) Date of Patent: May 26, 2009

(54) HEAD STACK ASSEMBLY INCLUDING A FLEXURE WITH RADIALLY INWARD FINGERS PROJECTING INTO A FLEXURE TAIL HOLE, AND METHOD OF COUPLING THE FLEXURE TO A FLEX CABLE

(75) Inventor: Tzong-Shii Pan, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 561 days.

(21) Appl. No.: 11/431,172

(22) Filed: May 10, 2006

(51) Int. Cl.
*G11B 21/08* (2006.01)
(52) U.S. Cl. .................................................. 360/264.2
(58) Field of Classification Search ........................ None
See application file for complete search history.

(56) References Cited

U.S. PATENT DOCUMENTS

| | | | |
|---|---|---|---|
| 5,668,684 A | 9/1997 | Palmer et al. | |
| 5,768,772 A | 6/1998 | Buechele | |
| 5,970,606 A | 10/1999 | Buechele | |
| 7,352,533 B1* | 4/2008 | Bjorstrom | 360/244 |
| 2003/0099066 A1* | 5/2003 | Kilmer | 360/264.2 |
| 2004/0257708 A1* | 12/2004 | Erpelding | 360/245.9 |

FOREIGN PATENT DOCUMENTS

| | | |
|---|---|---|
| JP | 10051152 A2 | 2/1998 |
| JP | 11053726 A2 | 5/1998 |
| JP | 10125023 A2 | 2/1999 |

* cited by examiner

*Primary Examiner*—Allen T Cao
(74) *Attorney, Agent, or Firm*—Barcelo & Harrison LLP

(57) ABSTRACT

There is provided a head stack assembly (HSA) for a disk drive. The head stack assembly includes an actuator, a flex cable attached to the actuator, and a head gimbal assembly (HGA) attached to the actuator. The HGA includes a read head and a flexure attached to the read head. The flexure includes a dielectric layer and a plurality of patterned conductive traces on the dielectric layer. The flexure terminates in a flexure tail including a flexure tail hole. The flexure tail includes at least three fingers that project radially inward into the flexure tail hole. There is also provided methods of attaching the flex cable assembly to the flexure.

31 Claims, 10 Drawing Sheets

HEAD STACK ASSEMBLY INCLUDING A FLEXURE WITH RADIALLY INWARD FINGERS PROJECTING INTO A FLEXURE TAIL HOLE, AND METHOD OF COUPLING THE FLEXURE TO A FLEX CABLE

FIELD OF THE INVENTION

The present invention relates generally to disk drives, and in particular a head stack assembly including a flexure with a radially inward fingers projecting into a flexure tail hole, and a method of coupling the flexure to a flex cable.

BACKGROUND

The typical hard disk drive includes a head disk assembly (HDA) and a printed circuit board assembly (PCBA) attached to a disk drive base of the HDA. The HDA includes at least one disk, a spindle motor for rotating the disk, and a head stack assembly (HSA). The PCBA includes a disk controller for generating servo control signals. The HSA includes a head for reading and writing data from and to the disk. The HSA is controllably positioned in response to the generated servo control signals from the disk controller to move the head relative to tracks of the disk.

The HSA includes an actuator assembly, at least one head gimbal assembly (HGA), and a flex cable assembly. The actuator assembly typically includes an actuator having an actuator body with one or more actuator arms extending from the actuator body. Each actuator arm supports the HGA that includes a head. An actuator coil is supported by the actuator body. The actuator coil interacts with a magnet to form a voice coil motor. The PCBA controls current passing through the actuator coil that results in a torque being applied to the actuator. The HSA further includes the flex cable assembly in electrical communication with the PCBA. The flex cable assembly supplies current to the coil and carries signals between the head and the PCBA.

A flexure extends along the load beam and is considered a sub-component of the HGA. The head is attached to and electrically connected to the flexure. The flexure includes a flexure tail that extends away from the head. The flexure tail is disposed adjacent the actuator body and attaches with the flex cable assembly. The flexure includes traces that extend from adjacent the head and terminate at electrical connection points at the flexure tail. The flex cable assembly includes a flex cable with electrical conduits that correspond to the electrical connection points of the flexure.

A topic of concern is that the flexure tail must be precisely aligned with and positioned on or adjacent the flex cable to allow for the electrical connection and secure attachment between the two components. In some cases, the flexure tail and the flex cable are manually held in place during the electrical connection process. This may be the case such as where ultrasonic tab bonding is used in the electrical connection process. Specialized tooling may be required to align and hold the flexure tail and the flex cable during the electrical connection process. This may be the case such as where soldering techniques are used in the electrical connection process. It is contemplated that there is need in the art for an improved flex cable assembly and flexure configuration to facilitate an ease of alignment and attachment of the flex cable assembly and the flexure.

SUMMARY

According to an aspect of the present invention, there is provided a head stack assembly (HSA) for a disk drive. The head stack assembly includes an actuator, a flex cable attached to the actuator, and a head gimbal assembly (HGA) attached to the actuator. The head gimbal assembly includes a read head and a flexure attached to the read head. The flexure includes a dielectric layer and a plurality of patterned conductive traces on the dielectric layer. The flexure terminates in a flexure tail including a flexure tail hole. The flexure tail includes at least three fingers that project radially inward into the flexure tail hole.

According to another embodiment, there is provided a method of coupling a flex cable to a flexure in a head stack assembly (HSA) for a disk drive. The method includes providing a head gimbal assembly (HGA) including a read head and the flexure attached to the read head. The flexure includes a dielectric layer and a plurality of patterned conductive traces on the dielectric layer. The flexure terminates in a flexure tail including a flexure tail hole. The flexure tail includes at least three fingers that extend from the dielectric layer radially inward into the flexure tail hole. The method further includes inserting a retaining pin of the HSA through the flexure tail hole in contact with the fingers. The method further includes electrically connecting the conductive traces to the flex cable.

According to yet another aspect, there is provided a method of coupling a flex cable to a flexure in a head stack assembly (HSA) for a disk drive. The method includes providing a head-gimbal assembly (HGA) including a read head and a flexure attached to the read head. The flexure includes a dielectric layer and a plurality of patterned conductive traces on the dielectric layer. The flexure terminates in a flexure tail including a flexure tail hole. The flexure tail includes at least three fingers that extend from the backing layer radially inward into the flexure tail hole. The method further includes inserting an alignment pin through the flexure tail hole in contact with the fingers. The method further includes electrically connecting the conductive traces to the flex cable.

DESCRIPTION OF THE PREFERRED EMBODIMENTS

Figure 1:
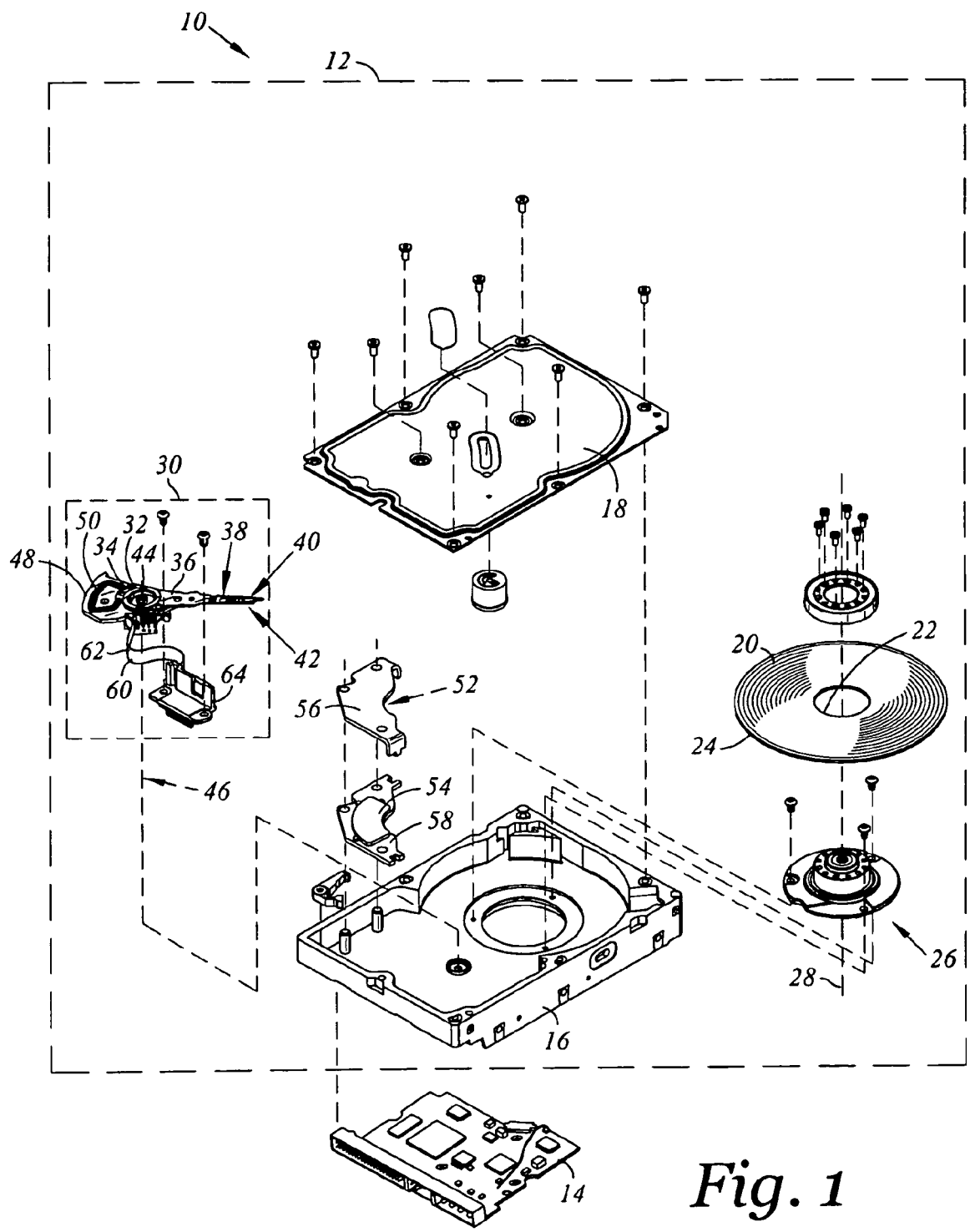
FIG. 1 is an exploded top perspective view of a disk drive including a head stack assembly according to an embodiment of the present invention.

Referring now to FIG. 1, there is depicted an exploded perspective view of a disk drive 10 according to an embodiment of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house a disk 20. A single disk 20 or additional disks may be utilized. The disk 20 includes an inner diameter (ID) 22 and an outer diameter (OD) 24. The disk 20 further includes a plurality of tracks for storing data. The disk 20 may be of a magnetic recording type of storage device, however, other arrangements such as optical recording may be utilized. The head disk assembly 12 further includes a spindle motor 26 for rotating the disk 20 about a disk rotation axis 28. The head disk assembly 12 further includes a head stack assembly (HSA) 30 rotatably attached to the disk drive base 16 in operable communication with the disk 20. The head stack assembly 30 includes an actuator 32.

The actuator 32 includes an actuator body 34 and an actuator arm 36 that extends from the actuator body 34. Distally attached to the actuator arm 36 is a suspension assembly 38. The suspension assembly 38 supports a head 40. The suspension assembly 38 with the head 40 is referred to as a head gimbal assembly (HGA) 42. It is contemplated that the number of actuator arms and suspension assemblies may vary depending upon the number of disks and disk surfaces utilized.

The head 40 typically includes a transducer for writing and reading data. The head 40 may be referred to as a read head. Each transducer typically includes a writer and a read element. In magnetic recording applications, the transducer's writer may be of a longitudinal or perpendicular design, and the read element of the transducer may be inductive or magnetoresistive. In optical and magneto-optical recording applications, the head 40 may also include an objective lens and an active or passive mechanism for controlling the separation of the objective lens from a disk surface of the disk 20. The disk 20 includes opposing disk surfaces. In magnetic recording applications the disk surface typically includes one or more magnetic layers. Data may be recorded along data annular regions on a single disk surface or both.

The head stack assembly 30 may be pivoted such that the head 40 is disposed adjacent to the various data annular regions from adjacent to the outer diameter 24 to the inner diameter 22 of the disk 20. Shown is a conventional "rotary" or "swing-type" actuator assembly. In this embodiment the actuator body 34 includes a bore, and the actuator 32 further includes a pivot bearing cartridge 44 engaged within the bore for facilitating the actuator body 34 to rotate between limited positions about an axis of rotation 46.

The actuator 32 further includes a coil support element 48 that extends from one side of the actuator body 34 opposite the actuator arms 36. The coil support element 48 is configured to support a coil 50. First and second magnets 52, 54 are supported by first and second magnet supports 56, 58 which are attached to the disk drive base 16 (the first magnet 52 is denoted in dashed lining and it is understood that it is disposed at an underside of the first magnet support 56). The coil 50 interacts with the first and second magnets 52, 54 to form a voice coil motor for controllably rotating the actuator 32. The printed circuit board assembly 14 includes a servo control system in the form of a disk controller for generating servo control signals. These servo control signals take the form of current passing through the coil 50 that results in a torque being applied to the actuator 32. The head stack assembly 30 further includes a flex cable assembly 60. The flex cable assembly 60 includes a flex cable 62 and a cable connector 64. The cable connector 64 is attached to the disk drive base 16 and is disposed in electrical communication with the printed circuit board assembly 14. The flex cable assembly 60 supplies current to the coil 46 and carries signals between the head 40 and the printed circuit board assembly 14.

Figure 2:
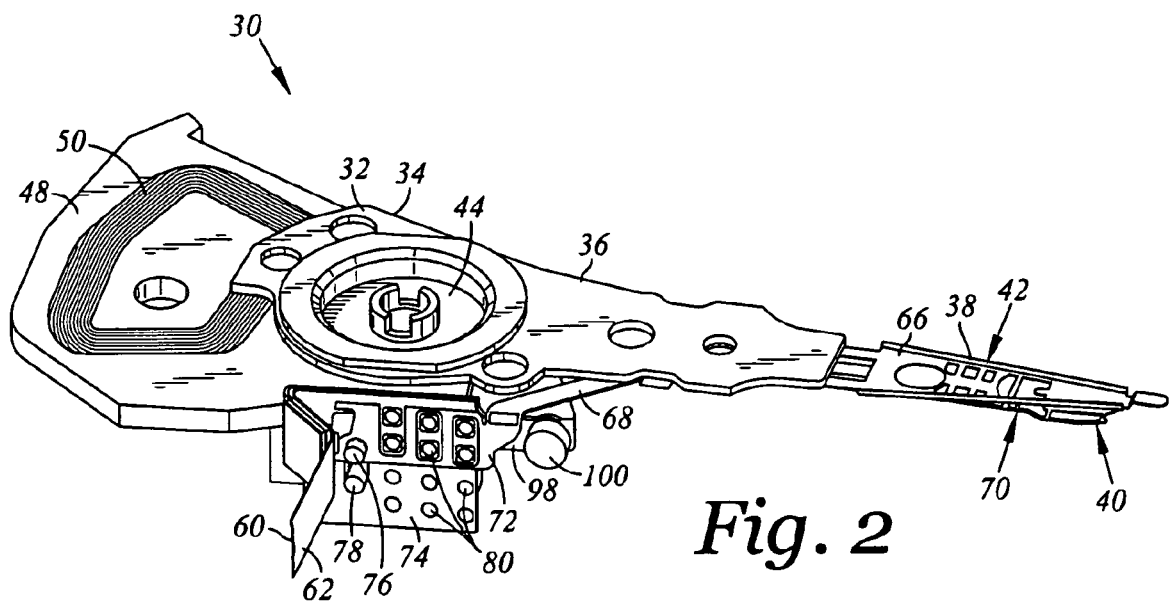
FIG. 2 is an enlarged top perspective view of the head stack assembly of FIG. 1 according to an embodiment.
Figure 3:
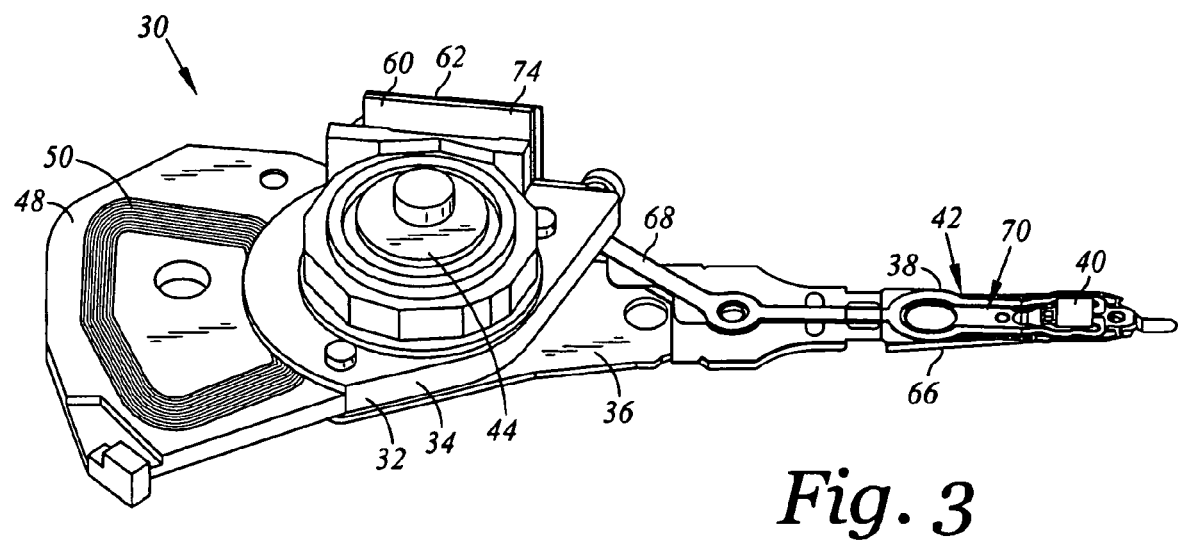
FIG. 3 is an enlarged bottom perspective view of the head stack assembly of FIG. 1.

Referring additionally to FIG. 2, there is depicted an enlarged top perspective view of the head stack assembly 30 of FIG. 1. FIG. 3 is an enlarged bottom perspective view of the head stack assembly 30 of FIG. 1. In the embodiment shown, the suspension assembly 38 includes a load beam 66. The load beam 66 is coupled to the actuator arm 36 with the load beam 66 extending distally from the actuator arm 36. A bend area of the load beam 66 is configured to allow the load beam 66 to flex relative to the actuator arm 36 to position the head 40 at a desired fly height above a surface of the disk 20.

A flexure 68 is electrically connected to the flex cable 62. As shown in FIG. 3, the flexure 68 is overlaid on the actuator arm 36 and the distally extending load beam 66. The flexure 68 may be referred to as a trace assembly or a trace suspension assembly. The flexure 68 extends along the actuator arm 36 and the load beam 66. The head 40 is attached to and electrically connected to the flexure 68 at a gimbal end 70 of the flexure 68. The flexure 68 includes a flexure tail 72 that is opposite the gimbal end 70. The flexure tail 72 is disposed adjacent the actuator body 34. As will be discussed in detail below, the flexure tail 72 is attached with the flex cable 62.

Figure 4:
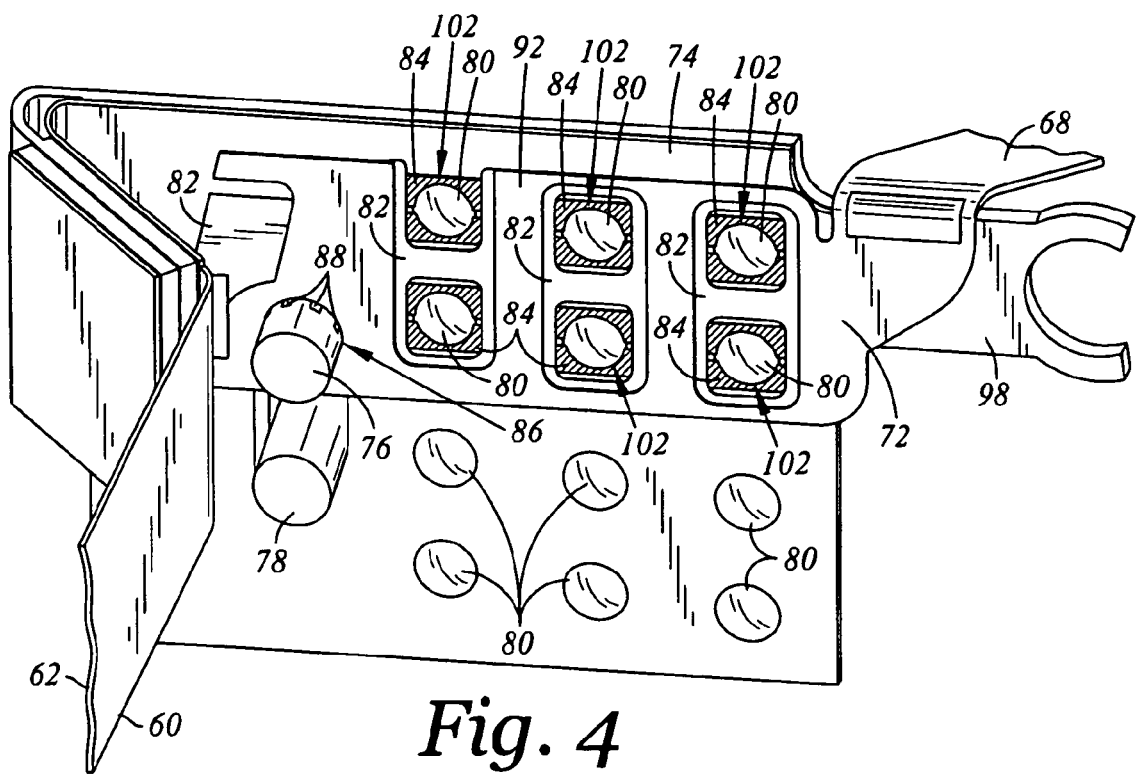
FIG. 4 is an enlarged perspective view of a portion of a flex cable assembly, a portion of the flexure tail, and retaining pins of an actuator of the head stack assembly of FIG. 2.
Figure 5:
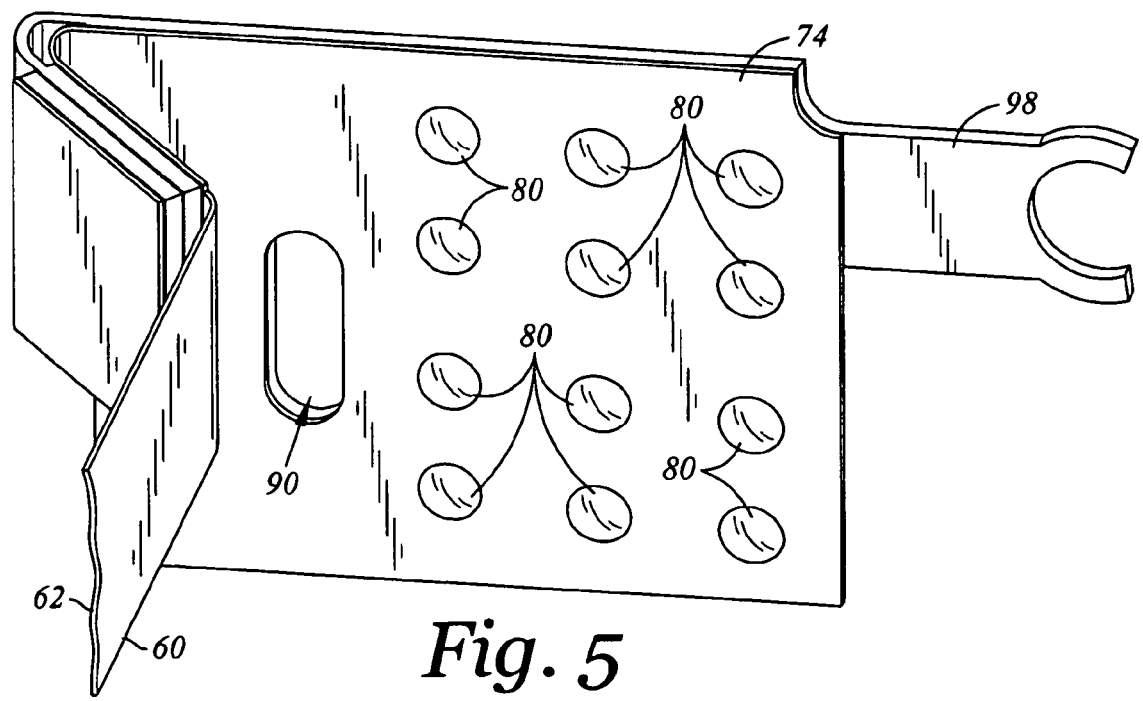
FIG. 5 is the perspective view of the portion of the flex cable assembly of FIG. 4.
Figure 6:
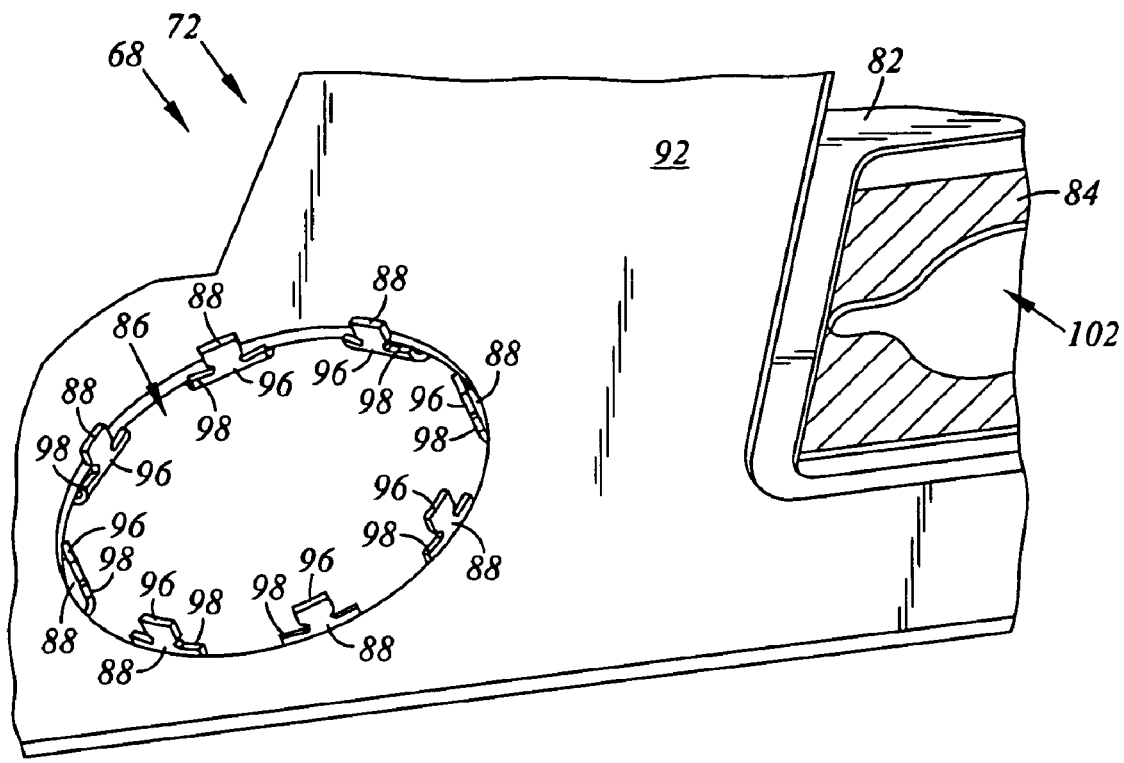
FIG. 6 is an enlarged top perspective view of a portion of the flexure tail with inwardly extending fingers of the head stack assembly of FIG. 2.

Referring now to FIG. 4, shown is an enlarged perspective view of a portion of the flex cable assembly 60 and a portion of the flexure tail 72 of the head stack assembly 30 of FIG. 2. Also shown are retention pins 76, 78 that extend from the actuator 32. FIG. 5 is the perspective view only of the portion of the flex cable assembly 60 of FIG. 4. FIG. 6 is an enlarged top perspective view of a portion of the flexure tail 72 of the head stack assembly 30 of FIG. 2.

The flex cable 62 includes a contact end 74 that is disposed opposite the cable connector 64. The flex cable 62 includes a plurality of electrical contacts 80 that are disposed at the contact end 74. In this embodiment there are twelve electrical contacts 80. In the view of FIGS. 2, 4 and 5, the uppermost six electrical contacts are associated with the flexure 68. The remaining six electrical contacts 80 may be used with an additional flexure (not shown) in an application where there is another actuator arm (not shown) to service an opposite side of the disk 20.

In the embodiment shown, there is provided the head stack assembly 30 for the disk drive 10. The head stack assembly 30 includes an actuator 32. The head stack assembly 30 further includes the flex cable 62 attached to the actuator 32. The head stack assembly 30 further includes the head gimbal assembly 42 attached to the actuator 32. The head gimbal assembly 42 includes the read head 40 and the flexure 68 attached to the head 40. The flexure 68 includes a dielectric layer 82 and a plurality of patterned conductive traces 84 on the dielectric layer 82. The flexure 68 terminates in the flexure tail 72 that includes a flexure tail hole 86. The flexure tail 72 includes at least three fingers 88 that project radially inward into the flexure tail hole 86 (11 fingers are in this embodiment as seen in FIGS. 6-9).

According to various embodiments, the dielectric layer 82 may be polyimide. The conductive traces 84 may be formed of a metal, such as copper. The flexure 68 further may include a backing layer 92 and the dielectric layer 82 may be disposed between the backing layer 92 and the conductive traces 84. The backing layer 92 may be stainless steel, for example. In this regard, the backing layer 92 may be used to provide structural support for the traces 84 and the head 40.

A retaining hole 90 may be formed through the contact end 74 of the flex cable 62. The retention pin 76 may extend from the actuator body 34, through the retaining hole 90 of the flex cable 62, and through the flexure tail hole 86 of the flexure 68. The retention pin 74 may define a retention pin diameter, and the flexure tail hole 86 may have a greatest diameter that exceeds the retention pin diameter. However, the retention pin 76 is disposed in contact with the fingers 88. This contact between the retention pin 76 and the fingers 88 may be utilized to retain the flex cable 62 and flexure tail 72 adjacent to each other and adjacent to the actuator body 34.

Each finger 88 may include a base portion 96 that extends inwardly about a periphery of the flexure tail hole 82. Each finger 88 may further include a finger tip portion 94 that extends distally from each respective base portion 86. Each base portion 96 may be wider than the finger tip portion 94 for a given finger 88. As can be best seen in FIG. 6, the fingers 88 are bent out of plane of a remainder of the dielectric layer 82 that is disposed about the locality of the flexure tail hole 86. The relatively reduced width of the finger tip portion 94 in comparison to the base portion 96 allows each of the fingers 88 to compliantly flap out of plane in contact with the retention pin 76.

The fingers 88 extend along a shaft of the retention pin 76 away from the contact end 74 of the flex cable 62 and the actuator body 34. As a result, the finger tip portions 94 of the fingers 88 tend to resist sliding of the flexure tail 72 along the retention pin 76 away from the actuator body 34 because this would tend to go "against the grain" of the finger tip portions 94.

As mentioned above, the flexure tail 72 includes at least three fingers 88 that project radially inward into the flexure tail hole 90. As used herein, the fingers 88 being in a state that project radially inward into the flexure tail hole 90 refers to the fingers 88 being disposed about an inner periphery of the flexure tail hole 90. The hole periphery portions between the fingers 88 define the flexure tail hole 90. As such, while portions of the fingers 88 are bent out of plane, the fingers 88 do initially begin about the periphery of the flexure tail hole 90, and are thus regarded as projecting radially inward. As mentioned above, at least three fingers 88 are provided. This is to restrict in-plane movement of the contact end 74 of the flex cable 62 in relation to the flex tail 72.

It is contemplated that the geometry, shape, and relative sizing of the fingers 88, the flexure tail hole 86, the retention pins 76, 78, and the retaining hole 90 may be different than as shown. For example, the fingers 88 may be more rounded than rectangular in configuration, and the flexure 68 and the retention pin 76 may have more of a squared cross section than circular as shown.

Figure 7:
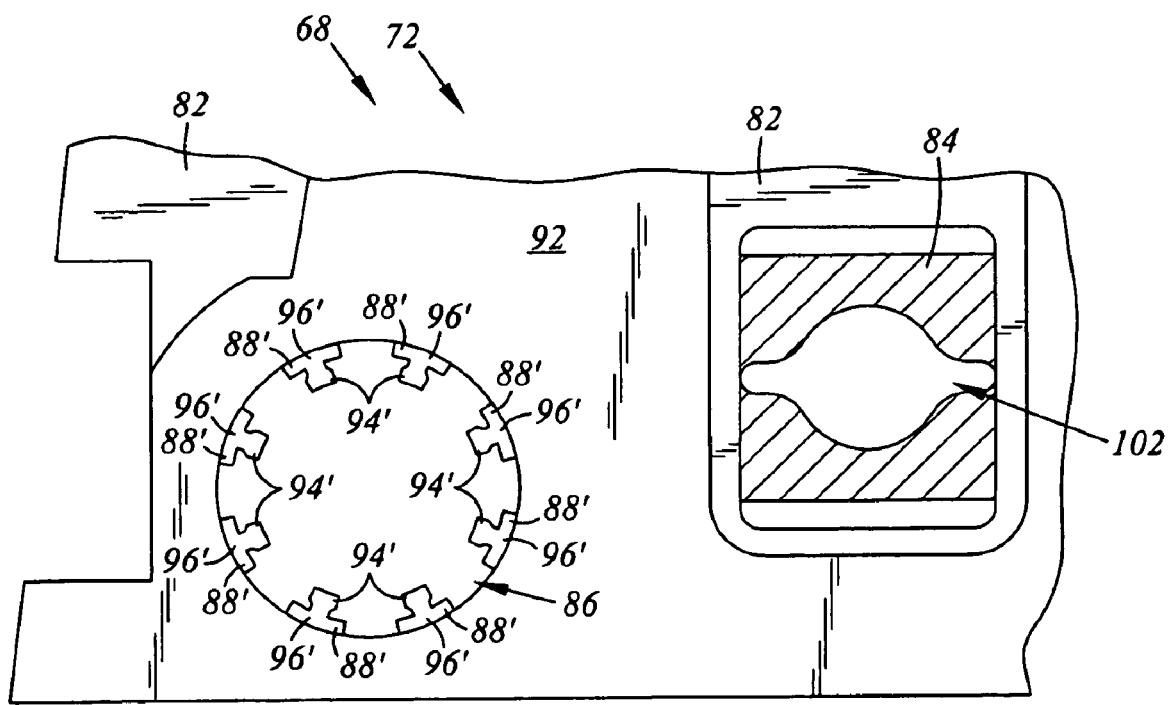
FIG. 7 is an enlarged plan view of a portion of the flexure tail of FIG. 6, however, with the inwardly extending fingers shown prior to installation with the flex cable assembly.
Figure 8:
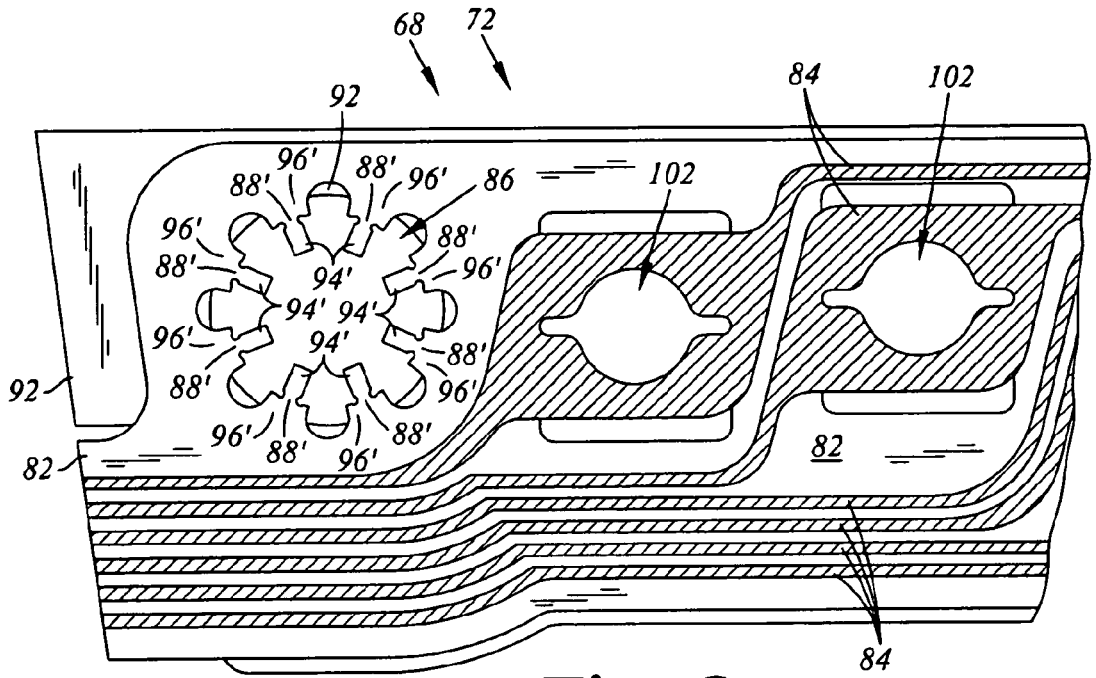
FIG. 8 is a plan view of an opposite side of the portion of the flexure tail of FIG. 7.

Referring additionally to FIG. 7 there is depicted an enlarged plan view of a portion of the flexure tail 72 of FIG. 6, however, with the inwardly extending fingers (denoted 88' in this un-bent configuration) shown prior to installation with the flex cable 62. FIG. 8 is a plan view of an opposite side of the portion of the flexure tail 72 of FIG. 7. Each finger 88' includes a base portion (denoted 96' in this un-bent configuration) and a finger tip portion (denoted 94' in this un-bent configuration) that extend in a common flat plane. The retention pin 76 may define a retention pin diameter, and the flexure tail hole 86 may have a least diameter defined by finger tip portions 94 of the fingers 88 with all of the fingers 88' in a common plane with the retention pin diameter exceeding the least diameter. Such sizing facilitates the interference between the fingers 88 and the retention pin 76 upon installation.

In this embodiment, each of the traces 84 includes a trace contact opening 102 at the flexure tail 72 as shown in FIGS. 4 and 6-8. The flexure tail 72 is disposed in electrical communication with the flex cable 60 at the contact end 74 with individual electrical contacts 80 in electrical communication with a corresponding contact opening 102 of the traces 84. The fingers 88 are configured to restrict movement of the contact end 74 of the flex cable 62 in relation to the flex tail 72. This aligns the electrical contacts 80 with the trace contact openings 102. The particular electrical connection techniques used to electrically connect the flex cable 60 and the flexure tail 72 may be chosen from those which are well known to one of ordinary skill in the art. For example, a soldering process may be utilized. This may include reflow soldering (which may involve simultaneous reflex soldering of multiple connection points), solder ball soldering, and solder jet bonding (SJB) techniques. Other electrical connection techniques may include ultrasonic tab bonding.

It is noted that the flexure 68 may include an electrically insulative coverlay portion that is laid upon the traces 84. Such coverlay portion would be seen in the view of FIG. 8, but is not shown for ease if illustration of the elements depicted.

In the embodiment shown, the flex cable assembly 60 may further include a bracket 98. A bracket pin 100 may extend from the actuator body 34 with the bracket 98 engaged with the bracket pin 100. This further facilitates maintaining the contact end 74 of the flex cable 62 adjacent the actuator body 34.

Figure 9:
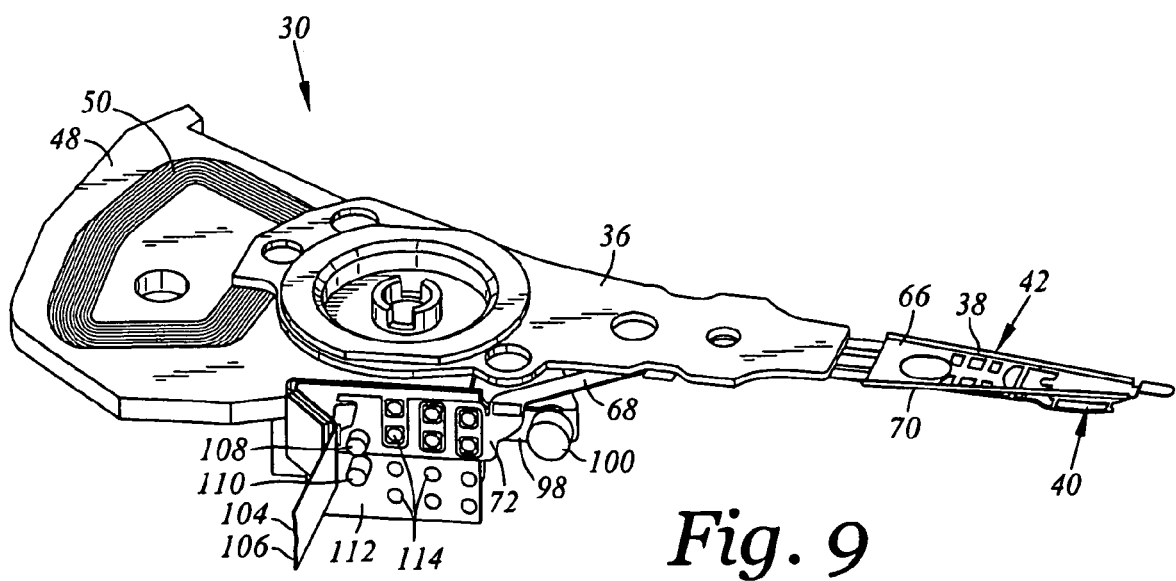
FIG. 9 is an enlarged top perspective view of a head stack assembly similar to that of FIG. 2, however according to another embodiment.
Figure 10:
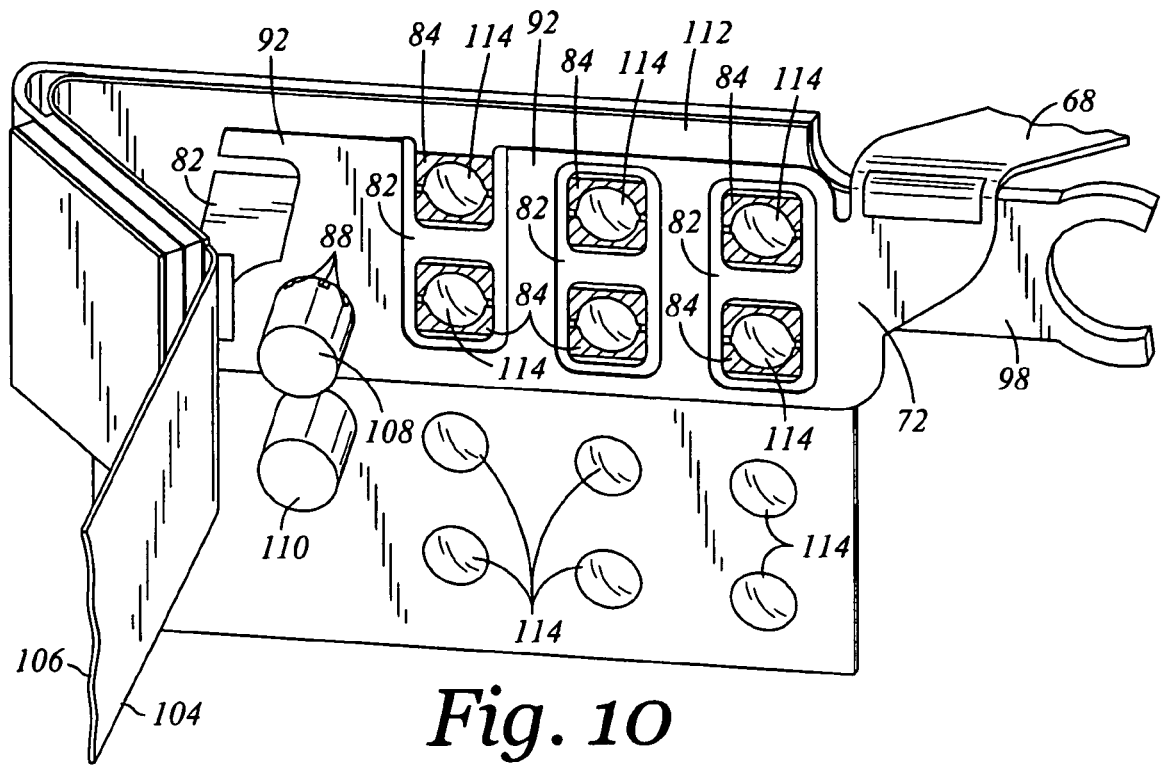
FIG. 10 is a view similar to that of FIG. 4, however with retention pins that extend from a flex cable assembly of the embodiment of FIG. 9.
Figure 11:
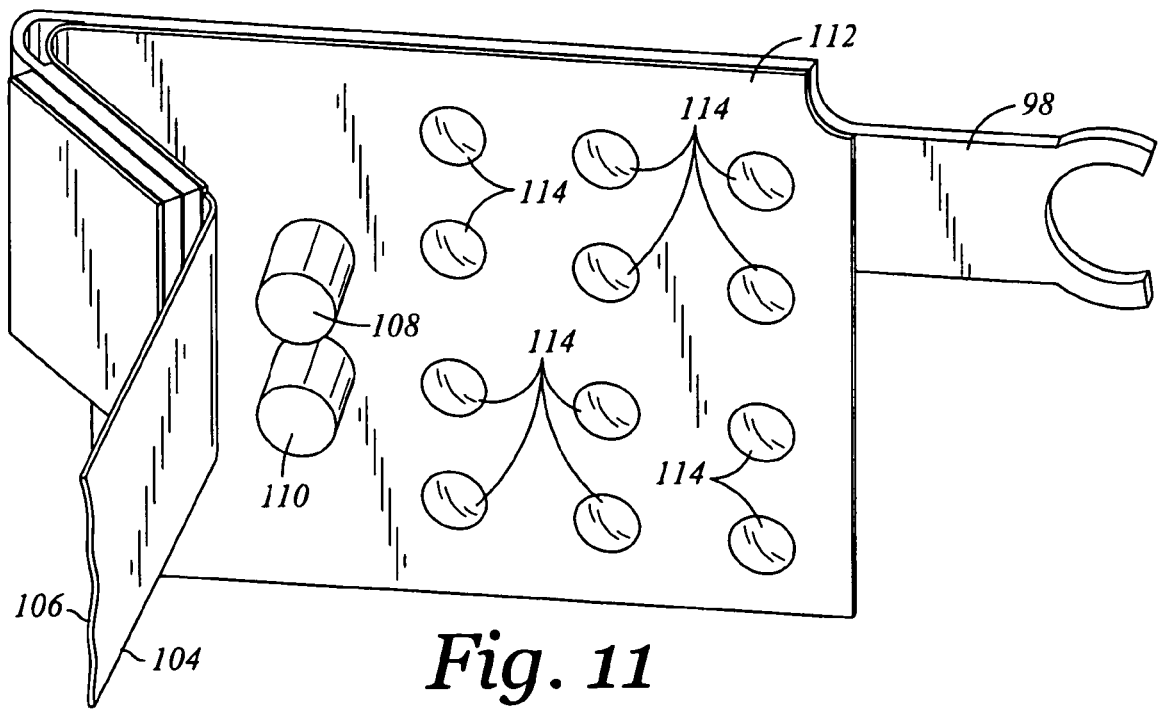
FIG. 11 is the perspective view of the portion of the flex cable assembly of FIG. 10.

Referring now to FIG. 9, there is depicted another embodiment. Similar reference numerals as those in relation to the embodiments shown in FIGS. 1-8 are used to indicate similarly configured components, however, with those differences as noted below. In this regard, FIG. 9 depicts a perspective view of a portion of the head stack assembly 30 similar to that of FIG. 2. However, in this embodiment, there is provided a flex cable assembly 104. The flex cable assembly 104 includes a flex cable 106 with a contact end 112 as additionally shown in FIGS. 10 and 11. In this embodiment, the flex cable 106 includes retention pins 108, 110. As can be seen, the retention pins 108, 110 extend from the flex cable 106, rather than the retention pins 76, 78 of the embodiment of FIGS. 1-8. The flexure tail 72 extends about the retention pin 108 with the fingers 88 in contact with the retention pin 108 in a like manner that the fingers 88 are in contact with the retention pin 76. As such, the fingers 88 tend to resist relative movement between the flex cable 62 and flexure tail 72.

The flex cable 104 further includes electrical contacts 114 which are similar to the electrical contacts 80 of the embodiment of FIGS. 1-8. In this regard, the flexure tail 72 may be electrically connected to the flex cable 106 as described above.

Figure 12:
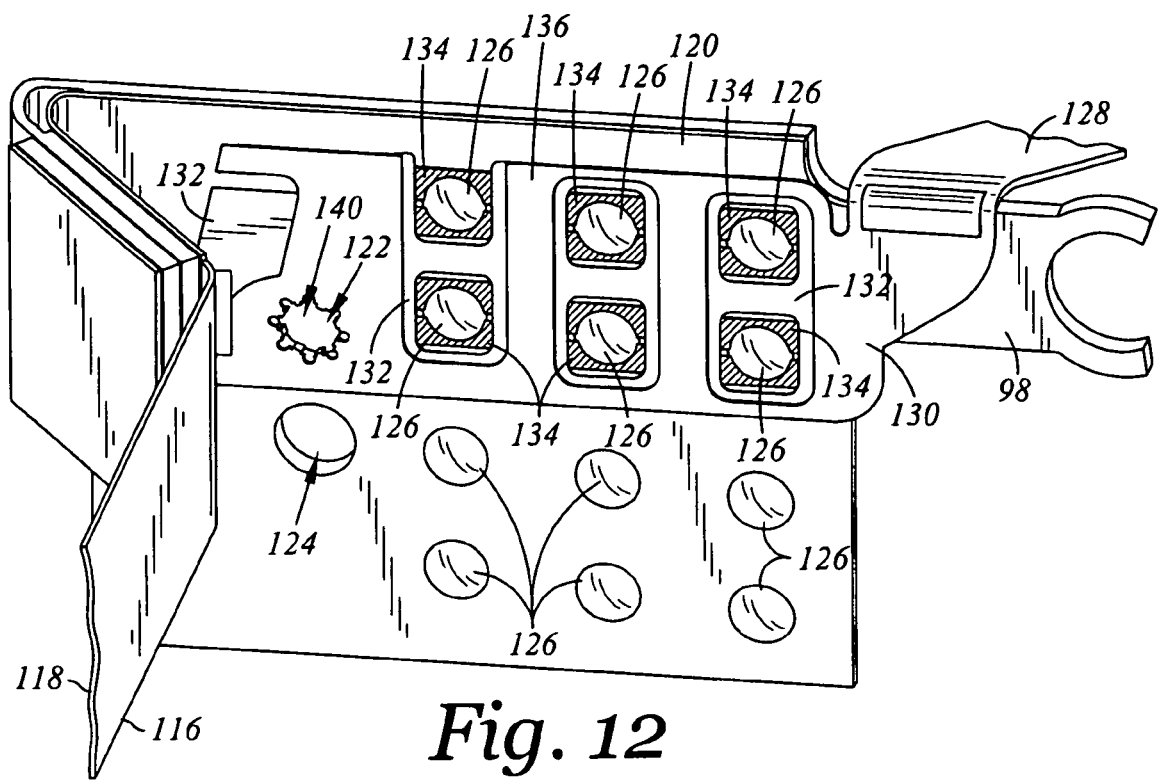
FIG. 12 is an enlarged perspective view of a portion of a flex cable assembly and a portion of the a flexure tail of the head stack assembly according to another embodiment.
Figure 13:
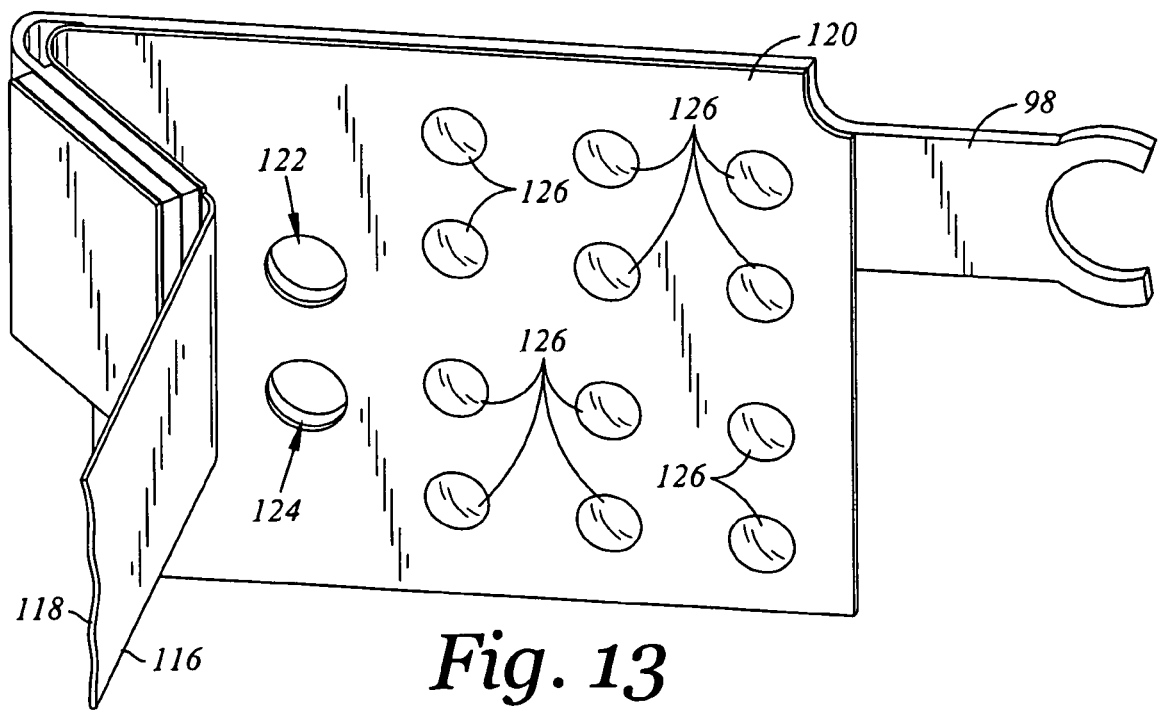
FIG. 13 is the perspective view of the portion of the flex cable assembly of FIG. 12.
Figure 14:
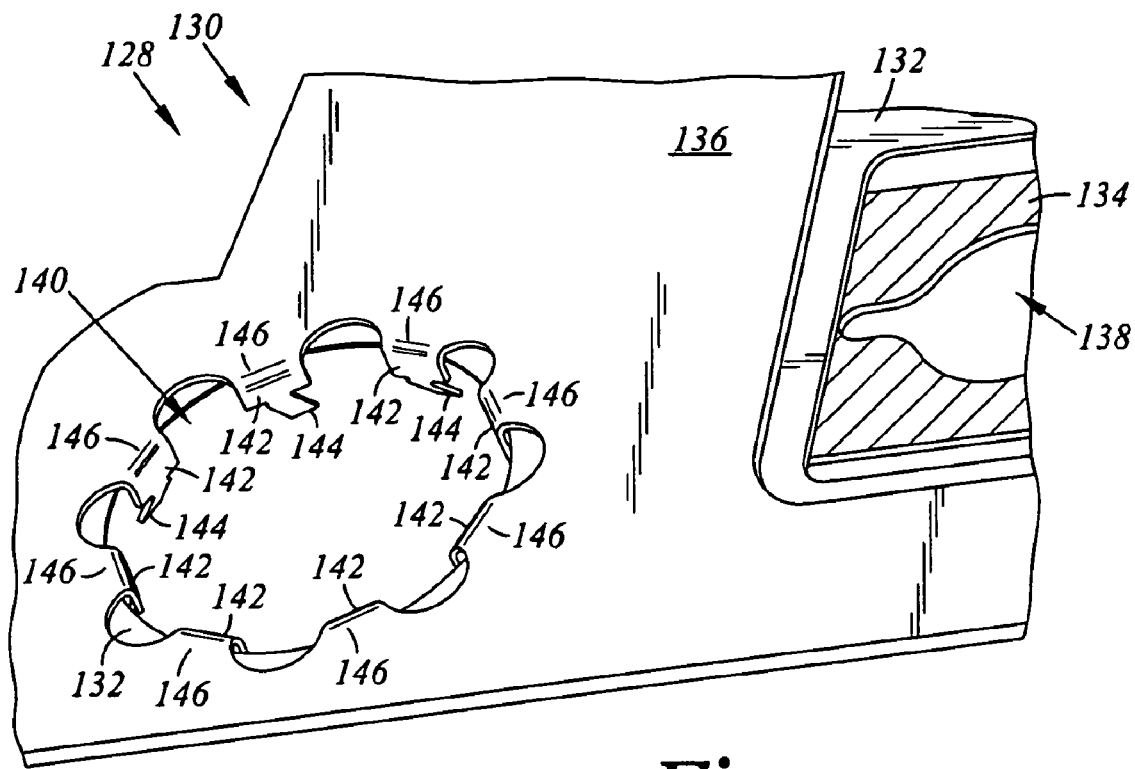
FIG. 14 is an enlarged top perspective view of a portion of the flexure tail with inwardly extending fingers of the head stack assembly.
Figure 15:
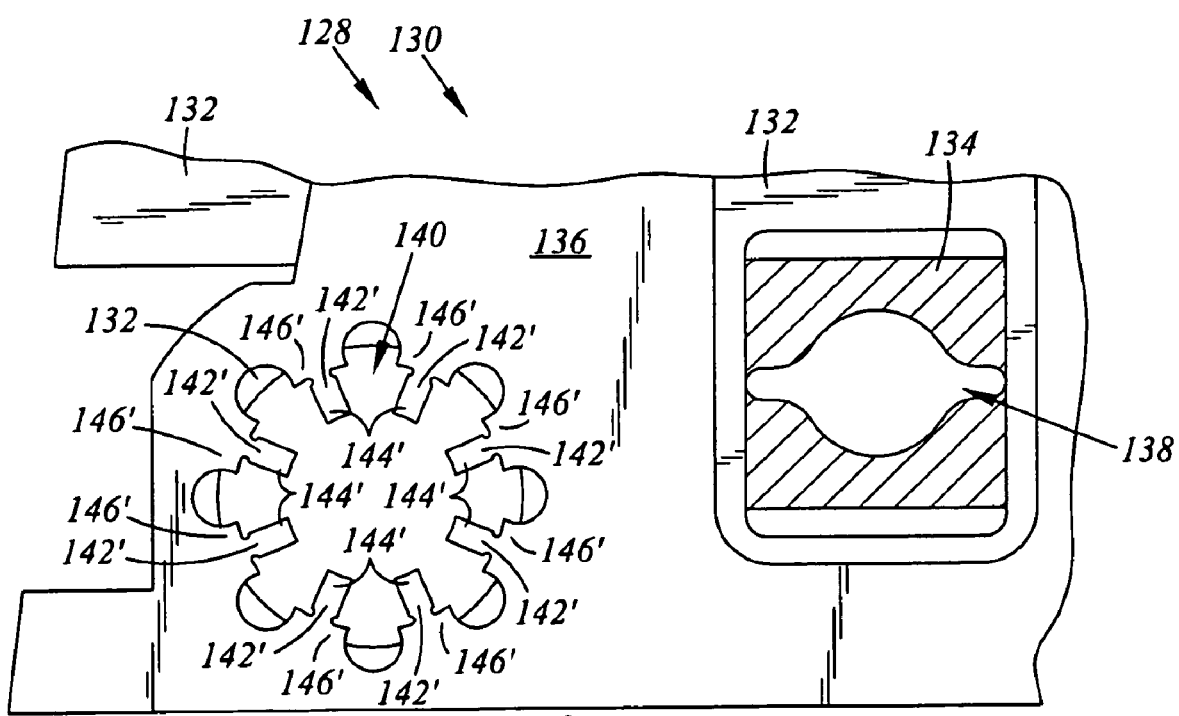
FIG. 15 is an enlarged plan view of a portion of the flexure tail of FIG. 14, however, with the inwardly extending fingers shown prior to installation with the flex cable assembly.
Figure 16:
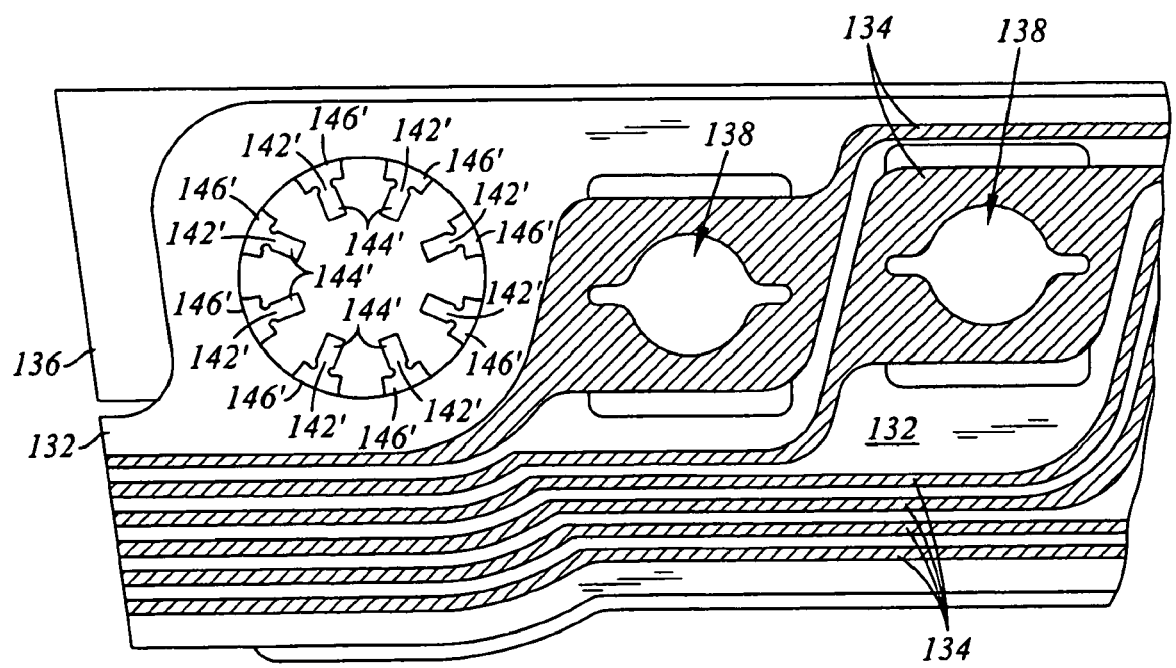
FIG. 16 is a plan view of an opposite side of the portion of the flexure tail of FIG. 15.

Referring now to FIGS. 12-16, there is depicted another embodiment. Similar reference numerals as those in relation to the embodiments shown in FIGS. 1-8 are used to indicate similarly configured components, however, with those differences as noted below. In this regard, FIG. 12 is a view similar to the view of FIG. 4 which depicts an enlarged perspective view of a portion of a flex cable assembly 116 and a portion of a flexure tail 130 of the head stack assembly 30 according to another embodiment. FIG. 13 is a view similar to the view of FIG. 5 which depicts the perspective view of the portion of the flex cable assembly 116 of FIG. 12. FIG. 14 is a view similar to the view of FIG. 6 which depicts an enlarged top perspective view of a portion of the flexure tail 130 with inwardly extending fingers 142. FIG. 15 is a view similar to the view of FIG. 4 which depicts an enlarged plan view of a portion of the flexure tail 130 of FIG. 14, however, with the inwardly extending fingers (denoted 142' in this un-bent configuration) shown prior to installation with the flex cable assembly 116. FIG. 16 is a view similar to the view of FIG. 4 which depicts a plan view of an opposite side of the portion of the flexure tail 130 of FIG. 15.

The flex cable assembly 116 includes a flex cable 118 with a contact end 120. The contact end 120 includes retaining holes 122, 124. The contact end 120 further includes a plurality of electrical contacts 126 similar to the electrical contacts 80. The head stack assembly 30 of this embodiment includes a flexure 128 that includes the flexure tail 130. The flexure 128 includes a dielectric layer 132 with electrical traces 134 disposed upon the dielectric layer 132. The flexure 128 further includes a backing layer 136 with the dielectric layer 132 between the backing layer 136 and the traces 134.

The flex cable 118 is disposed in electrical communication with the flexure 128. Each of the traces 134 may include a trace contact opening 138 at the flexure tail 130. The flexure tail 130 is disposed in electrical communication with the flex cable 118 at the contact end 120 with individual electrical contacts 126 in electrical communication with a corresponding contact opening 138 of the traces 134.

In this embodiment, the fingers 142 extend from the backing layer 136. The flexure tail 130 includes the fingers 142 (as least three fingers) that project radially inward into a flexure tail hole 140. Each of the fingers 142 includes a finger tip portion 144 that extends from a base portion 146. Each finger 142 is bent out of plane and into the retaining hole 122 of the flex cable 118. As such, the backing layer 136 may define a plane and each finger 142 may be bent out of the plane of the backing layer 136. Further, each finger 142 defines a finger length, and the flex cable 118 defines a thickness. The finger length may be greater than the thickness of the flex cable 118. Such relative sizing facilitates the fingers 142 to extend through the flex cable 118. Furthermore, the finger tip portions 144 may be bent back upon the flex cable 118 with the fingers 142 blooming open in radially outward directions with regard to the retaining hole 122 to securely lock the flexure 128 to the flex cable 118 in multiple degrees of freedom.

As mentioned above, FIGS. 15 and 16 depict a portion of the flexure tail 130 with the fingers (denoted 142' in an un-bent configuration). In this regard, the finger tip portion (denoted 144') and the base portion (denoted 146') in such flat or un-bent configuration.

Figure 17:
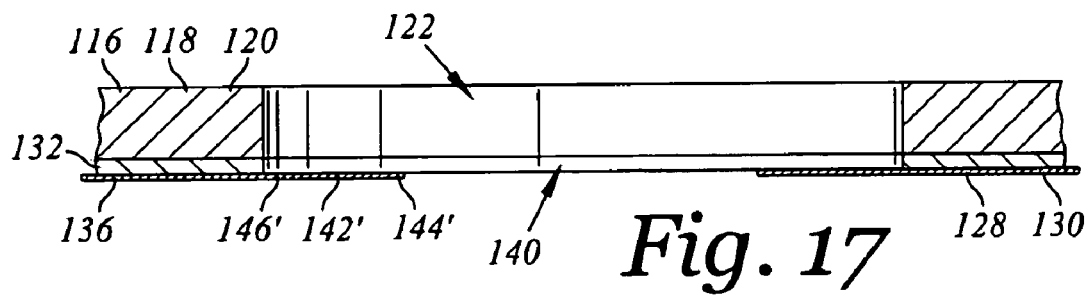
FIG. 17 is a cross-sectional side view of the portion of the flexure tail and a portion of the flex cable assembly of FIG. 15.

Referring additionally now to FIGS. 17-20, there is depicted an installation sequence of the flexure 128 and the flex cable 118. FIG. 17 is a cross-sectional side view of a portion of the flexure tail 130 and a portion of the flex cable assembly 116 in the vicinity of the retaining hole 122 of FIG. 15. The fingers 142' with the finger portion 144' and the base portion 146' are initially in the unbent configuration. The flexure 128 is initially placed adjacent the flex cable 166 with the flexure tail hole 140 aligned with the retaining hole 122.

Figure 18:
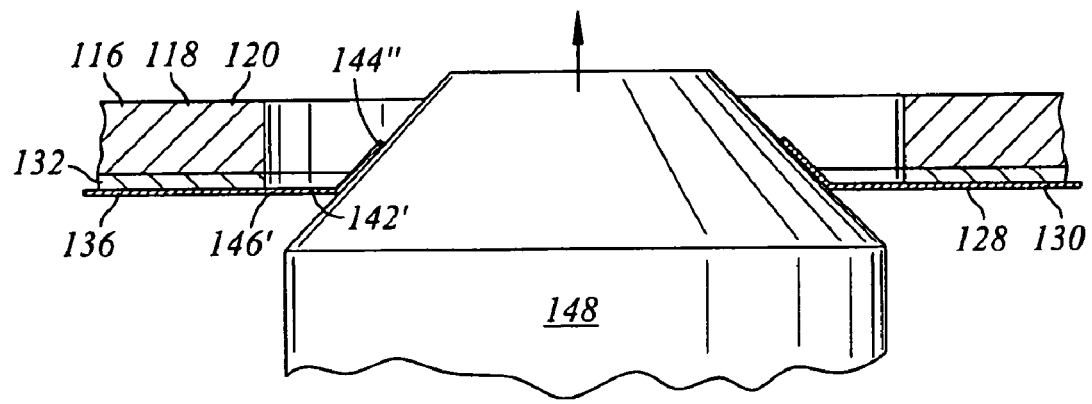
FIG. 18 is the cross-sectional side view of FIG. 17, however, with a alignment pin engaged with finger tip portions of the fingers of the flexure tail.

FIG. 18 depicts the cross-sectional side view of FIG. 17, however, with an alignment pin 148 in contact with the fingers 142'. In this view, the alignment pin 148 is moved in an upwardly direction into the flexure tail hole 140. The alignment pin 148 is shown to have initially contacted the finger tip portions (denoted 144" in this intermediate bent configuration). The finger tip portions 144" are bent in relation to the base portions 146'. The fingers 142' are plastically deformed with the finger top portions 144' and the base portions 146' angularly disposed with regard to each other. In this embodiment, the alignment pin 148 is a separate tooling component that is not a part of the head stack assembly 116.

Figure 19:
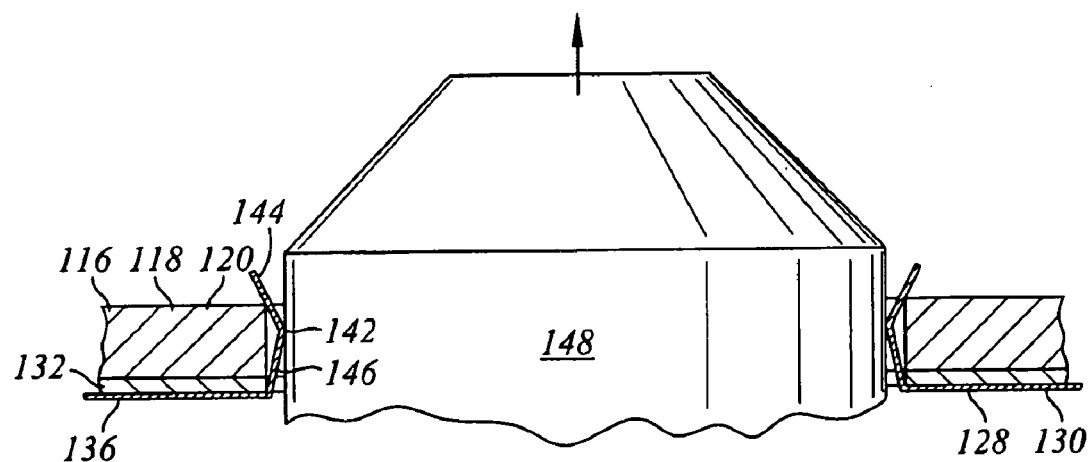
FIG. 19 is the cross-sectional side view of FIG. 18, however, with the alignment pin extending into the flexure tail and the flex cable assembly.
Figure 20:
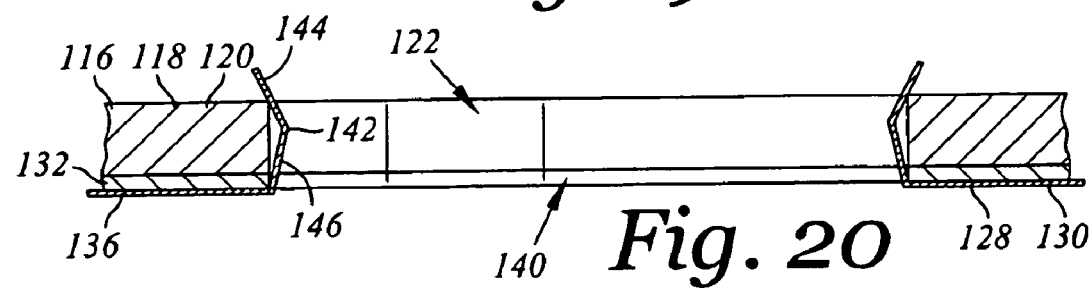
FIG. 20 is the cross-sectional side view of FIG. 19, however, with the alignment pin removed and the flexure installed with the flex cable assembly.

FIG. 19 is the cross-sectional side view of FIG. 18, however, with the alignment pin 148 extending further into the flexure tail hole 140 and the retaining hole 122 of the flex cable assembly 116. As can be seen the alignment pin 148 has come into contact with the base portion 146 to bend it out of plane. The fingers 142 are bent with the finger tip portions 144 folded back over and around the flex cable 118. The fingers 142 are plastically deformed with the base portions 146' angularly disposed with regard to a remainder of the backing layer 136 in the vicinity about the flexure tail hole 140. FIG. 20 is the cross-sectional side view of FIG. 19, however, with the alignment pin 148 removed and the flexure 128 installed with the flex cable assembly 116. With the flexure tail 130 secured adjacent to the contact end 120 of the flex cable 118, the flexure 128 may be electrically connected to the flex cable 118 in a manner as described above.

I claim:

1. A head stack assembly (HSA) for a disk drive, the HSA comprising:
    an actuator;
    a flex cable attached to the actuator; and
    a head gimbal assembly (HGA) attached to the actuator, the HGA including a read head and a flexure attached to the read head, the flexure including a dielectric layer and a plurality of patterned conductive traces on the dielectric layer, the flexure terminating in a flexure tail including a flexure tail hole, the flexure tail including at least three fingers that project radially inward into the flexure tail hole.

2. The HSA of claim 1 wherein the dielectric layer comprises polyimide.

3. The HSA of claim 1 wherein the fingers extend from the dielectric layer.

4. The HSA of claim 3 further includes a retention pin extending through the flexure tail hole in contact with the fingers.

5. The HSA of claim 4 wherein the retention pin extends from the flex cable.

6. The HSA of claim 4 wherein the retention pin extends from the actuator through a hole in the flex cable.

7. The HSA of claim 3 wherein the retention pin defines a retention pin diameter, the flexure tail hole having a greatest diameter that exceeds the retention pin diameter.

8. The HSA of claim 3 wherein the retention pin defines a retention pin diameter, the flexure tail hole having a least diameter defined by finger tip portions of the fingers with all of the fingers in a common plane, the retention pin diameter exceeding the least diameter.

9. The HSA of claim 1 wherein the flexure includes a backing layer, the dielectric layer disposed between the backing layer and the conductive traces, the fingers extending from the backing layer.

10. The HSA of claim 9 wherein the backing layer comprises stainless steel.

11. The HSA of claim 9 wherein each finger defines a finger length greater than a flex cable thickness of the flex cable.

12. The HSA of claim 9 wherein the backing layer defines a plane and each finger is bent out of the plane of the backing layer.

13. The HSA of claim 12 wherein the flex cable includes a retaining hole, the fingers extending through the retaining hole.

14. The HSA of claim 12 wherein the fingers each include a base portion and a finger tip portion extending from the base portion, each base portion being wider than the finger tip portion for a given finger.

15. A method of coupling a flex cable to a flexure in a head stack assembly (HSA) for a disk drive, the method comprising:
   providing a head gimbal assembly (HGA) including a read head and the flexure attached to the read head, the flexure including a dielectric layer and a plurality of patterned conductive traces on the dielectric layer, the flexure terminating in a flexure tail including a flexure tail hole, the flexure tail including at least three fingers that extend from the dielectric layer radially inward into the flexure tail hole;
   inserting a retaining pin of the HSA through the flexure tail hole in contact with the fingers; and
   electrically connecting the conductive traces to the flex cable.

16. The method of claim 15 wherein the retaining pin is inserted through the flexure tail hole with the conductive traces disposed between the flex cable and the dielectric layer.

17. The method of claim 15 wherein the retaining pin extends from the flex cable.

18. The method of claim 15 wherein the HSA includes an actuator body and the retaining pin extends from the actuator body.

19. The method of claim 15 wherein the electrically connecting includes soldering.

20. The method of claim 19 wherein the soldering includes reflow soldering.

21. The method of claim 15 wherein the electrically connecting includes ultrasonic tab bonding.

22. A method of coupling a flex cable to a flexure in a head stack assembly (HSA) for a disk drive, the method comprising:
   providing a head-gimbal assembly (HGA) including a read head and a flexure attached to the read head, the flexure including a dielectric layer and a plurality of patterned conductive traces on the dielectric layer, the flexure terminating in a flexure tail including a flexure tail hole, the flexure tail including at least three fingers that extend from the backing layer radially inward into the flexure tail hole;
   inserting an alignment pin through the flexure tail hole in contact with the fingers; and
   electrically connecting the conductive traces to the flex cable.

23. The method of claim 22 wherein the alignment pin is inserted through the flexure tail hole with the dielectric layer disposed between the flex cable and the conductive traces.

24. The method of claim 22 wherein the inserting of the alignment pin includes plastically deforming the fingers.

25. The method of claim 22 wherein the flex cable includes a retaining hole, the inserting of the alignment pin through the flexure tail hole further includes inserting the alignment pin through the retaining hole.

26. The method of claim 25 wherein the alignment pin is removed from both the flexure tail hole and the retaining hole after the inserting of the alignment pin through the flexure tail hole and the retaining hole.

27. The method of claim 22 wherein the alignment pin is not a part of the HSA.

28. The method of claim 22 wherein the electrically connecting includes soldering.

29. The method of claim 28 wherein the soldering includes reflow soldering.

30. The method of claim 22 wherein the electrically connecting includes ultrasonic tab bonding.

31. The method of claim 22 further includes removing the alignment pin from the flexure tail hole.

* * * * *